W. H. HUTT.
DISINFECTING APPARATUS FOR PRIVY-SEATS.

No. 172,123. Patented Jan. 11, 1876.

Witnesses
Saml. J. Van Staveren
Jos. B. Connolly

Inventor
William H. Hutt M.D.
By Connolly Bros. Attorneys

UNITED STATES PATENT OFFICE.

WILLIAM H. HUTT, OF PHILADELPHIA, PENNSYLVANIA.

IMPROVEMENT IN DISINFECTING APPARATUS FOR PRIVY-SEATS.

Specification forming part of Letters Patent No. 172,123, dated January 11, 1876; application filed December 1, 1875.

*To all whom it may concern:*

Be it known that I, WM. H. HUTT, M. D., of Philadelphia, in the county of Philadelphia and State of Pennsylvania, have invented a certain new and useful Disinfecting Apparatus for Privy-Seats; and I do hereby declare the following to be a full, clear, and exact description of the invention, such as will enable others skilled in the art to which it pertains to make and use it, reference being had to the accompanying drawings which form part of this specification, in which—

Figure 1:
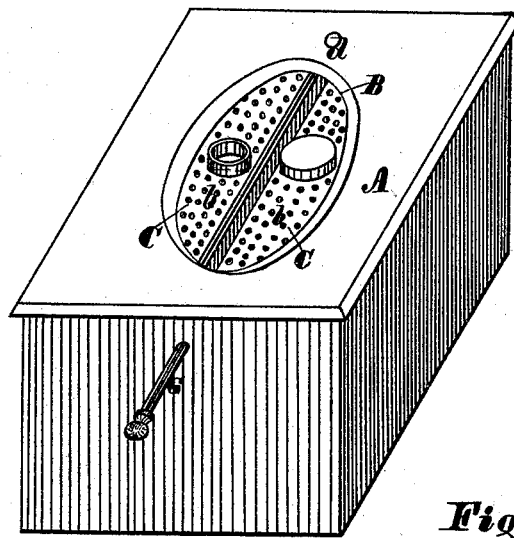
Figure 2:
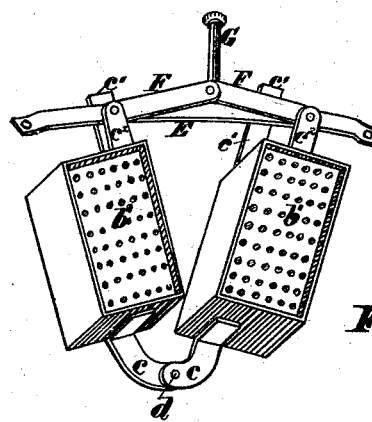

Figure 1 is a front view, in perspective, of the seat and disinfecting apparatus. Fig. 2 is a back view in perspective of the disinfecting apparatus.

The object of my invention is to provide an attachment for privy-seats, adapted to receive chemical agents for disinfecting or deodorizing the poisonous and deleterious exhalations which are at present allowed to pass up through said seats, polluting the surrounding atmosphere, and spreading disease and infection in every direction.

My invention consists of a box or boxes, provided with a perforated top and bottom, and an opening in the former, closed by a cap, for the admission of chemicals. I prefer to use two boxes, and these I arrange beneath the opening in the seat in such manner that they will close or seal the said opening from below, so that all ascending gases or vapors must pass through them and through the chemical agent or disinfectant in them contained. Said boxes are so hung and provided with handles, &c., that when it is desired to use the "hole" in the seat for the purpose for which said opening is mainly designed, they may be spread apart, leaving an unobstructed passage for fecal or urinary discharge.

Referring to the accompanying drawing, A designates a privy-seat, having the usual hole or opening B. C C represent boxes hung beneath the seat, having ears $c$ $c$, through which passes a pivot, $d$. In front the boxes are provided with projections $c^1$ $c^1$ sustained upon a depressed way, E, and with lugs $c^2$ $c^2$, by means of which they form a pivotal connection with the toggle-joint levers F F. G is an arm, pivoted to the levers F F, and extended to project beyond the front support of the seat. When this arm or rod is drawn out the boxes C C are brought closely together; when said arm or rod is pressed in the boxes are spread apart for the purpose already suggested. The boxes are formed with perforated or foraminated tops and bottoms $b$ $b^1$, and are each provided with openings $b^2$, closed by caps $b^3$, for the admission of chemicals—as chloride of lime or copperas, the former being preferred, as, when it becomes inert, it may be readily washed out by pouring water on it or upon the top $b$.

I have shown and described two boxes, but do not limit myself to any particular number, reserving the privilege of using one or more. I have also shown a specified arrangement of devices for spreading and bringing together said boxes; but I do not wish to be confined to any such or other arrangement for that purpose, as I may employ mechanical equivalents or substitutes therefor.

For the chemicals suggested charcoal or other disinfectant may be substituted, and wire-gauze or lattice-work employed in lieu of the perforated metal tops and bottoms of the boxes.

What I claim as my invention is—

1. The apparatus herein described, consisting of a box or boxes, with perforated or foraminated top and bottom, arranged to seal or close the privy-seat opening, and susceptible of being spread apart or moved out of the way when occasion requires, substantially as described.

2. A chemical or disinfectant receptacle placed beneath a privy-seat, so as to compel ascending gases to pass through the same, for the purpose set forth.

In testimony that I claim the foregoing I have hereunto set my hand this 24th day of November, 1875.

WILLIAM H. HUTT, M. D.

Witnesses:
GEO. C. SHELMERDINE,
M. DAN'L CONNOLLY.